(12) United States Patent
Kramer et al.

(10) Patent No.: US 11,466,103 B2
(45) Date of Patent: Oct. 11, 2022

(54) METHODS FOR PROVIDING POLYVINYL CHLORIDE PARTICLES FOR PREPARING CHLORINATED POLYVINYL CHLORIDE

(71) Applicant: Oxy Vinyls, LP, Dallas, TX (US)

(72) Inventors: Keith S. Kramer, Andover, KS (US); Lance Mayer, Strongsville, OH (US); Rodney L. Klausmeyer, Wichita, KS (US)

(73) Assignee: Oxy Vinyls, LP, Dallas, TX (US)

( * ) Notice: Subject to any disclaimer, the term of this patent is extended or adjusted under 35 U.S.C. 154(b) by 493 days.

(21) Appl. No.: 15/741,019

(22) PCT Filed: Mar. 7, 2017

(86) PCT No.: PCT/US2017/021148
§ 371 (c)(1),
(2) Date: Dec. 29, 2017

(87) PCT Pub. No.: WO2017/155989
PCT Pub. Date: Sep. 14, 2017

(65) Prior Publication Data
US 2018/0194875 A1 Jul. 12, 2018

Related U.S. Application Data

(60) Provisional application No. 62/305,136, filed on Mar. 8, 2016.

(51) Int. Cl.
| | | |
|---|---|---|
| *C08F 114/06* | (2006.01) | |
| *C08F 14/06* | (2006.01) | |
| *C08F 2/18* | (2006.01) | |
| *C08F 2/20* | (2006.01) | |
| *C08F 6/24* | (2006.01) | |
| *C08F 8/22* | (2006.01) | |
| *C08L 27/06* | (2006.01) | |
| *C08F 6/00* | (2006.01) | |
| *C08F 2/38* | (2006.01) | |
| *C08F 2/44* | (2006.01) | |
| *C08F 8/20* | (2006.01) | |
| *C08L 1/28* | (2006.01) | |
| *C08L 29/04* | (2006.01) | |
| *C08L 31/04* | (2006.01) | |
| *C08L 71/02* | (2006.01) | |

(52) U.S. Cl.
CPC ............ *C08F 6/24* (2013.01); *C08F 2/18* (2013.01); *C08F 2/38* (2013.01); *C08F 2/44* (2013.01); *C08F 6/003* (2013.01); *C08F 6/006* (2013.01); *C08F 6/008* (2013.01); *C08F 8/20* (2013.01); *C08F 8/22* (2013.01); *C08L 1/284* (2013.01); *C08L 27/06* (2013.01); *C08L 29/04* (2013.01); *C08L 31/04* (2013.01); *C08L 71/02* (2013.01)

(58) Field of Classification Search
CPC ...... C08F 6/24; C08F 2/18; C08F 2/44; C08F 6/003; C08F 6/006; C08F 6/008; C08F 8/20; C08F 8/22; C08L 1/284; C08L 27/06; C08L 29/04; C08L 31/04; C08L 71/02
See application file for complete search history.

(56) References Cited

U.S. PATENT DOCUMENTS

| | | | |
|---|---|---|---|
| 2,426,080 A | 8/1947 | Chapman et al. | |
| 2,996,489 A | 8/1961 | Dannis et al. | |
| 3,100,762 A | 8/1963 | Shockney | |
| 3,334,077 A | 8/1967 | George | |
| 3,532,612 A | 10/1970 | Weben et al. | |
| 3,632,848 A | 1/1972 | Young et al. | |
| 3,670,056 A | 12/1972 | Heiberger et al. | |
| 4,137,202 A * | 1/1979 | Heinen | C08F 14/06 524/739 |
| 4,319,012 A * | 3/1982 | Morningstar | C08F 14/06 526/202 |
| 4,331,775 A | 5/1982 | Hall | |
| 4,377,459 A | 3/1983 | Parker | |
| 4,412,898 A | 11/1983 | Olson et al. | |
| 4,487,899 A | 12/1984 | White | |
| 5,006,607 A | 4/1991 | Sharaby et al. | |
| 5,849,831 A | 12/1998 | Takada | |
| 6,197,895 B1 | 3/2001 | Suzuki et al. | |
| 6,590,041 B1 | 7/2003 | Eguchi et al. | |
| 7,572,389 B2 | 8/2009 | Fokken et al. | |
| 8,222,325 B2 * | 7/2012 | Michel | C08L 27/06 428/34.3 |

(Continued)

FOREIGN PATENT DOCUMENTS

| | | |
|---|---|---|
| CN | 1401672 A | 3/2003 |
| CN | 101550211 | 10/2009 |

(Continued)

OTHER PUBLICATIONS

International Search Report dated Jul. 18, 2017 for corresponding PCT/US2017/021148.
Office Action from Japanese Patent Office in patent application No. JP2017-566870 dated Jan. 29, 2019.
Office Action in Chinese Application No. 201780015189.3; dated May 8, 2020.
English-translated Office Action from patent application JP2020-004439; dated Nov. 24, 2020.
English-translated Office Action from patent application JP2020-108367; dated Aug. 3, 2021.

*Primary Examiner* — Irina S Zemel
*Assistant Examiner* — Jeffrey S Lenihan
(74) *Attorney, Agent, or Firm* — Renner, Kenner; Arthur M. Reginelli

(57) ABSTRACT

A method for providing particles of polyvinyl chloride, wherein the particles offer improved chlorinating efficiency, the method comprising (i) providing polyvinyl chloride particles; and (ii) introducing a chlorination accelerant to the polyvinyl chloride particles to thereby provide polyvinyl chloride particles having an accelerant associated therewith.

17 Claims, 1 Drawing Sheet

(56) References Cited

U.S. PATENT DOCUMENTS

2002/0169268 A1    11/2002   Kawakubo et al.
2004/0186257 A1    9/2004   Usuki et al.
2006/0094808 A1    5/2006   Kim et al.
2017/0210832 A1    7/2017   Munshi et al.

FOREIGN PATENT DOCUMENTS

| | | |
|---|---|---|
| CN | 102617765 | 8/2012 |
| CN | 104231130 A | 12/2014 |
| CN | 104927261 A | 9/2015 |
| EP | 0802201 B2 | 10/1997 |
| EP | 1445265 A1 | 8/2004 |
| JP | 62-091503 A | 4/1987 |
| JP | 03-166205 A | 7/1991 |
| JP | 04-106110 A | 4/1992 |
| JP | 10-306108 A | 11/1998 |
| WO | 2016012937 A1 | 1/2016 |

\* cited by examiner

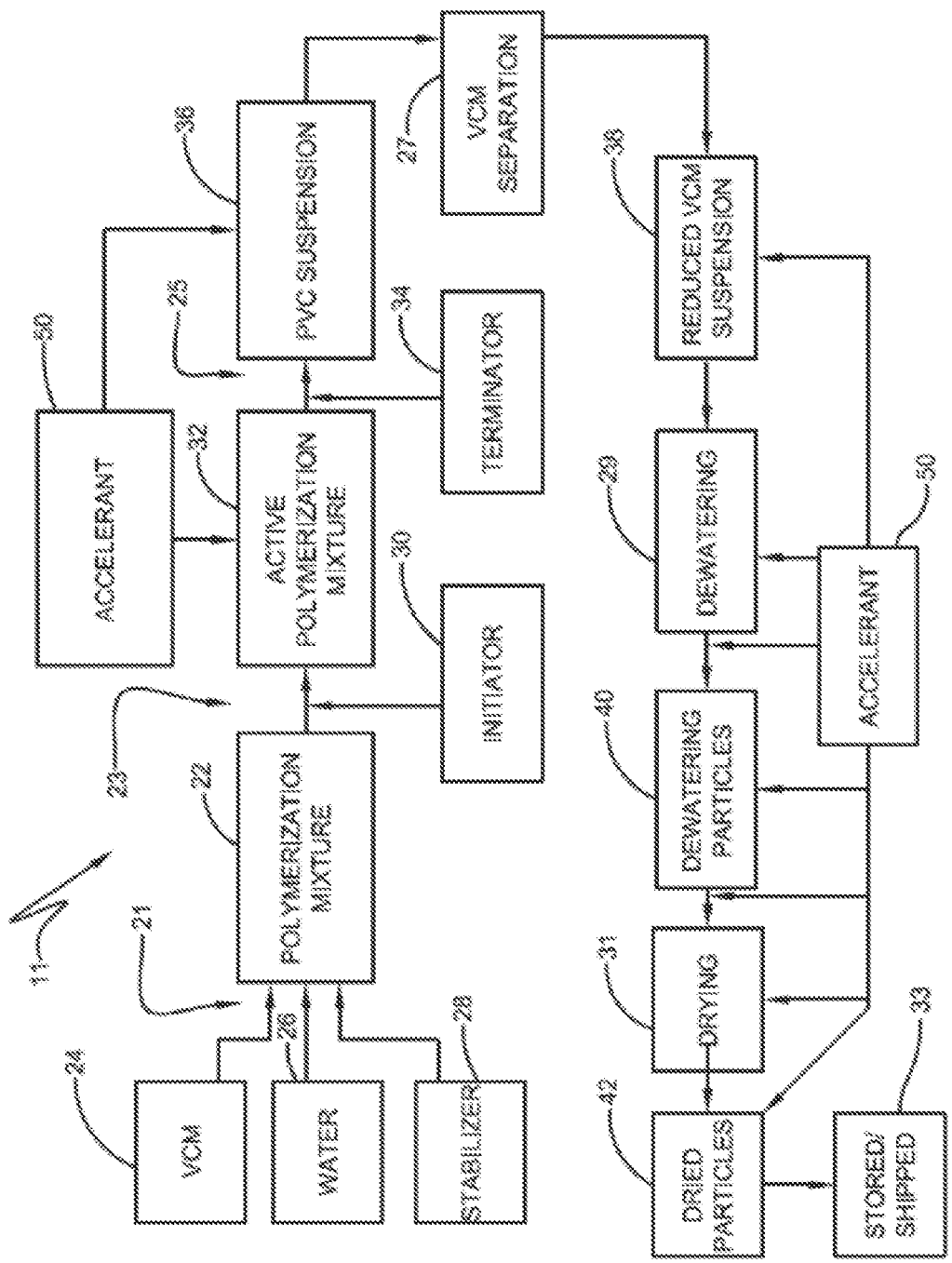

ated polyvinyl chloride. According to
METHODS FOR PROVIDING POLYVINYL CHLORIDE PARTICLES FOR PREPARING CHLORINATED POLYVINYL CHLORIDE This application claims the benefit of U.S. Provisional Application Ser. No. 62/305,136, filed on Mar. 8, 2016, which is incorporated herein by reference.

TECHNICAL FIELD

Embodiments of the invention are directed toward methods for preparing polyvinyl chloride particles that are useful for preparing chlorinated polyvinyl chloride. According to one or more aspects of the invention, the polyvinyl chloride particles produced by this invention, which are associated with a chlorination accelerant, advantageously undergo chlorination at increased rates.

BACKGROUND

Chlorinated polyvinyl chloride (CPVC) offers advantages over polyvinyl chloride. For example, chlorinated polyvinyl chloride can withstand water at temperatures greater than 60° C. to 70° C. or higher, which is an advantage over polyvinyl chloride, and thus makes chlorinated polyvinyl chloride suitable for use as a material for water piping systems in residential and commercial construction. Chlorinated polyvinyl chloride also has greater resistance to many chemicals. Additionally, the mechanical strength of chlorinated polyvinyl chloride makes it a viable candidate to replace many types of metal pipe in conditions where metal is susceptible to corrosion.

Chlorination of polyvinyl chloride resin to produce chlorinated polyvinyl chloride is generally known in the art. Chlorinated polyvinyl chloride can be made via a free radical chlorination reaction of polyvinyl chloride particles. The reaction can occur via a radically initiated reaction wherein a chlorine radical adds to the polyvinyl chloride. For example, chlorine gas can be decomposed into free radical chlorine by UV light, and the radical chlorine is then reacted with polyvinyl chloride resin, essentially replacing a portion of the hydrogen in the polyvinyl chloride molecule with chlorine.

There have been prior art efforts directed to improving the synthesis of chlorinated polyvinyl chloride. For example, U.S. Pat. No. 2,996,489 discloses the use of a swelling or wetting agent, such as a chlorinated hydrocarbon to improve diffusion of the chlorine through the polyvinyl chloride polymer particle. Similarly, U.S. Pat. No. 3,334,077 discloses a method of chlorinating polyvinyl chloride resin in an aqueous medium containing an organic swelling agent for the polyvinyl chloride resin, where the chlorination reaction is conducted in the presence of an acrylic acid polymer.

The prior art has further recognized the problem of relatively slow chlorination rates of vinyl chloride resins. For example, U.S. Pat. No. 3,100,762 describes obtaining faster chlorination than proposed in U.S. Pat. No. 2,996,489 by conducting the chlorination at elevated temperature and pressure in the presence of a swelling agent, and in the absence of photo-illumination. It is suggested that neither catalyst nor photo-illumination is required under the prescribed conditions of temperature and pressure if oxygen is substantially excluded from the reactor. Significantly, however, inferior chlorinated products are obtained under these reaction conditions when the chloromethane swelling agent is omitted from the reaction mixture.

In a further effort to improve chlorination rates, U.S. Pat. No. 4,412,898 discloses photo-chlorination of polyvinyl chloride particles in an aqueous suspension without the use of swelling agents by employing elevated pressure and temperature.

Despite improvements that have been made, there remains a desire to improve the chlorination rate of PVC.

SUMMARY

One or more embodiments of the present invention provide a method for providing particles of polyvinyl chloride, wherein the particles offer improved chlorinating efficiency, the method comprising (i) providing polyvinyl chloride particles; and (ii) introducing a chlorination accelerant to the polyvinyl chloride particles to thereby provide polyvinyl chloride particles having an accelerant associated therewith.

DESCRIPTION OF DRAWINGS

The FIGURE is a flow chart showing one or more methods of the present invention.

DETAILED DESCRIPTION

Embodiments of the invention are based, at least in part, on the discovery of polyvinyl chloride particles (which may be referred to as PVC particles) having a chlorination accelerant associated therewith. It has unexpectedly been discovered that these particles can undergo chlorination at an increased rate, which provides greater efficiencies in the chlorination process. Moreover, it has been unexpectedly discovered that the manner in which the chlorination accelerant is associated with polyvinyl chloride particles impacts the rate at which chlorination takes place. Accordingly, embodiments of the invention are directed toward methods for associating a chlorination accelerant with polyvinyl chloride particles.

Process Overview

In one or more embodiments, a chlorination accelerant is associated with particles of polyvinyl chloride, which may be referred to as PVC particles, as part of the manufacturing process for making the PVC particles.

A process for making PVC particles can be described with reference to the FIGURE, which shows process 11 including a step 21 of forming a polymerization mixture 22 by combining vinyl chloride monomer 24, which may also be referred to as VCM 24, water 26, and a stabilizer 28. The addition of an initiator 30 to polymerization mixture 22 within an initiation step 23 forms an active polymerization mixture 32 wherein VCM undergoes polymerization within polymerization step 25 to form active polyvinyl chloride particles. The term active polyvinyl chloride particles refers to the fact that the polyvinyl chloride particles are reactive and can add additional vinyl chloride monomer to their polymer structure through this reactivity. The addition of a terminator 34 to active polymerization mixture 32 quenches the active nature of the polyvinyl chloride particles so that VCM polymerization ceases. The newly formed polyvinyl chloride particles nonetheless remain suspended in the aqueous medium as a polyvinyl chloride suspension 36, which may also be referred to as PVC suspension 36.

Typical PVC production processes then include a separation step 27 of removing VCM from the PVC suspension by using various well known techniques. Separation step 27 provides a reduced VCM suspension 38 that is substantially free of VCM. Reduced VCM suspension 38 can then be further processed, for example, by separating the polyvinyl chloride particles from the water within a dewatering step 29. The dewatered particles 40 can be further dried within a drying step 31 to produce dried PVC particles 42, which may be stored or shipped within subsequent steps 33.

As suggested above, a chlorination accelerant is associated with the PVC particles by introducing the chlorination accelerant to the PVC at one or more locations or process steps of the PVC production process.

As also shown in the FIGURE, chlorination accelerant 50 can be added at several locations within process 11. For example, chlorination accelerant 50 can be added to active polymerization mixture 32. In other embodiments, chlorination accelerant 50 can be added to PVC suspension 36 following termination step 25. In other embodiments, chlorination accelerant 50 can be added to reduced VCM suspension 38 following VCM separation step 27. In yet other embodiments, chlorination accelerant 50 can be introduced to the PVC particles during dewatering step 29. In still other embodiments, chlorination accelerant 50 can be added to dewatered PVC particles 40. In yet other embodiments, chlorination accelerant 50 can be introduced to the PVC particles during drying step 29. In still other embodiments, chlorination accelerant 50 can be added to dried PVC particles 42.

Chlorination Accelerant

The chlorination accelerant includes those compounds that can be associated with the PVC particles to provide increased chlorination rates when the PVC particles are chlorinated. In one or more embodiments, the chlorination accelerant, which may also be referred to as a chlorinating accelerant, is a nonionic oligomer or polymer containing a hydroxyl group functionality attached to an aliphatic and/or ether-linked backbone. In one or more embodiments, the oligomer or polymer includes a backbone having at least 10, in other embodiments at least 15, and in other embodiments at least 20 carbon atoms. In these or other embodiments, the oligomer or polymer contains at least 1, in other embodiments at least 2, and in other embodiments at least 3 hydroxyl groups. In one or more embodiments, the chlorination accelerant is at least appreciably soluble in water.

Examples of useful chlorination accelerants include polyvinyl alcohol, partially hydrolyzed poly(vinyl acetate) homopolymer, partially hydrolyzed co-polymers of vinyl acetate and comonomer, heat-treated partially hydrolyzed poly(vinyl acetate) homopolymer, heat-treated partially hydrolyzed co-polymers of vinyl acetate and comonomer, polyethylene glycol, poly(alkylene) oxides (e.g. poly(ethylene) oxide and poly(propylene) oxide), hydroxypropyl cellulose, hydroxyethyl cellulose, hydroxypropyl methylcellulose, and water-soluble cellulose esters. The chlorination accelerant may include unsaturation. As the skilled person will appreciate, unsaturation, particularly in the case of poly(vinyl acetate), may derive from comonomer or through heat treatment of the polymer. Some useful chlorination accelerants are disclosed in U.S. Pat. Nos. 4,226,966, 7,070,731, and 8,222,325, and U.S. Publication Nos. 2010/0234508 and 2012/0309880, which are incorporated herein by reference.

In one or more embodiments, the chlorination accelerant (e.g. partially hydrolyzed poly(vinyl acetate)) may be characterized by having an average hydrolysis of greater than 60 mole %, in other embodiments greater than 70 mole %, in other embodiments greater than 72 mole %, in other embodiments greater than 80 mole %, in other embodiments greater than 85 mole %, in other embodiments greater than 90 mole %, in other embodiments greater than 95 mole %, and in other embodiments greater than 99 mole % hydrolyzed. In one or more embodiments, the chlorination accelerant (e.g. partially hydrolyzed poly(vinyl acetate)) may be characterized by having an average hydrolysis of less than 99.5 mole %, in other embodiments less than 99 mole %, in other embodiments less than 98 mole %, in other embodiments less than 95 mole %, in other embodiments less than 90 mole %, in other embodiments less than 85 mole %, in other embodiments less than 80 mole %, and in other embodiments less than 75 mole % hydrolyzed. In one or more embodiments, the chlorination accelerant (e.g. partially hydrolyzed poly(vinyl acetate)) may be characterized by having an average hydrolysis of from about 60 mole % to about 99.5 mole %, in other embodiments from about 70 mole % to about 98 mole %, and in other embodiments from about 70 mole % to about 80 mole % hydrolyzed.

In one or more embodiments, the chlorination accelerant (e.g. hydroxypropyl methylcellulose) may be characterized by having a hydroxypropoxyl content of from about 3 to about 15 weight %, and in other embodiments from about 5 to about 12 weight %. In one or more embodiments, the chlorination accelerant (e.g. hydroxypropyl methylcellulose) may be characterized by having a methoxyl content of from about 15 to about 35 weight %, and in other embodiments from about 18 to about 30 weight %.

Amount of Accelerant

The amount of chlorination accelerant associated with the PVC particles can be quantified based upon the weight parts of the accelerant relative to the weight parts of the PVC particles. In one or more embodiments, the amount of accelerant associated with the PVC particles according to practice of the present invention is at least 50, in other embodiments at least 500, in other embodiments at least 750, in other embodiments at least 1000, and in other embodiments at least 1250 parts by weight accelerant per one million parts by weight PVC particles (ppm by weight relative to the weight of the PVC particles). In these or other embodiments, the amount of accelerant associated with the PVC particles according to practice of the present invention is at most 10,000, in other embodiments at most 7,500, in other embodiments at most 5,000, and in other embodiments at most 2,500 ppm by weight relative to the weight of the PVC particles. In one or more embodiments, the amount of accelerant associated with the PVC particles according to the practice of the present invention is from about 50 to about 10,000, in other embodiments from about 500 to about 7,500, and in other embodiments from about 750 to about 5,000 ppm by weight relative to the weight of the PVC particles.

PVC Synthesis

Turning back to the synthesis of the PVC particles, the polymerization of VCM, which is initiated by the introduction of an initiator 30, proceeds by a suspension polymerization wherein VCM is suspended as a discontinuous phase (e.g. droplets) in an aqueous medium by combining VCM 24 with water 26 and suspension stabilizers 28. This polymerization mixture 22 is typically maintained in suspension by introducing mechanical energy (e.g. agitation).

In one or more embodiments, suspension stabilizers 28 include those compounds that are conventionally employed in the art of forming PVC particle suspensions and therefore include, without limitation, water-soluble polymers and insoluble inorganic powders. Exemplary water-soluble polymers include poly(vinyl alcohol), hydroxy-propylcellulose, sodium poly(styrene sulfonate), and sodium salts of acrylic acid-acrylate ester copolymers. Exemplary inorganic powders include talc, hydroxyapatite, barium sulfite, kaolin, magnesium carbonate, magnesium hydroxide, calcium phosphate, and aluminum hydroxide.

In one or more embodiments, polymerization mixture 22, which includes VCM 24 suspended in water 26, may be characterized by a water to VCM weight ratio of at least 0.9:1, in other embodiments at least 2:1, in other embodiments at least 3:1, and in other embodiments at least 4:1. In these or other embodiments, the suspension may be characterized by a water to VCM weight ratio of at most 10:1, in other embodiments at most 9:1, and in other embodiments at most 8:1. In one or more embodiments, the suspension has a water to VCM weight ratio of from about 0.9:1 to about 10:1, in other embodiments from about 2:1 to about 9:1, and in other embodiments from about 3:1 to about 8:1.

In one or more embodiments, the amount of suspension stabilizer 28 included within polymerization mixture 22 may be quantified based upon the weight parts of the stabilizer relative to the weight parts of the VCM droplets. In one or more embodiments, the amount of stabilizer included within polymerization mixture 22 is at least 10, in other embodiments at least 50, in other embodiments at least 100, and in other embodiments at least 500, parts by weight stabilizer per one million parts by weight VCM droplets (ppm by weight relative to the weight of the VCM droplets). In these or other embodiments, the amount of stabilizer included within polymerization mixture 22 is at most 1000, in other embodiments at most 750, in other embodiments at most 500, and in other embodiments at most 400 ppm by weight relative to the weight of the VCM droplets. In one or more embodiments, the amount of stabilizer included within polymerization mixture 22 is from about 10 to about 1000, in other embodiments from about 50 to about 750, and in other embodiments from about 100 to about 500 ppm by weight relative to the weight of the VCM droplets.

Polymerization mixture 22 may be prepared in a conventional vessel for conducting the synthesis of PVC particles. For example, polymerization mixture 22 may be prepared within a continuously stirred tank reactor. In one or more embodiments, the reactor may be equipped with a condenser. In one or more embodiments, polymerization of VCM takes place using batch polymerization techniques.

In one or more embodiments, useful initiators include radical initiators that are soluble within the VCM droplets. Exemplary initiators include, but are not limited to, di-isobutyrylperoxide, 1,3-di(2-neodecanoylperoxyisopropyl) benzene, alpha cumylperoxy neodecanoate, 1,1,3,3-tetramethylbutyl-peroxy neodecanoate, sec-butyl peroxydicarbonate, di-2-ethylhexyl peroxydicarbonate, diethyl peroxydicarbonate, bis(4-tert-butylcyclohexyl) peroxydicarbonate, dicetyl peroxydicarbonate, dimyristyl peroxydicarbonate, tert-butylperoxy neodecanoate, tert-butylperoxy neoheptanoate, dilauroyl peroxide, and azobisisobutyronitrile (AIBN).

As indicated above, once initiator 30 is introduced to form active polymerization mixture 32, polymerization of VCM takes place. As is known in the art, suspension stabilizers can be added during the early stages of polymerization (e.g. up to 50% conversion of VCM). Likewise, the introduction of mechanical energy, typically in the form of agitation, is continued during the polymerization step 25.

Polymerization of the VCM is allowed to proceed until a desired conversion is achieved, at which time the polymerization of the VCM is terminated or ceased (e.g. short stopped) by the introduction of terminator 34. Useful terminators include free radical traps such as free radical scavengers or compounds that react with peroxides to form stable or non-free radical moieties. In one or more embodiments, the polymerization is terminated after 75%, in other embodiments after 80%, in other embodiments after 85%, and in other embodiments after 90% conversion of the available VCM. Termination of active polymerization mixture 32 produces a PVC suspension 36, which includes PVC particles, unreacted VCM, and stabilizer.

In one or more embodiments, suspension 36 may be characterized by a water to polymer weight ratio of at least 1:1, in other embodiments at least 2:1, in other embodiments at least 3:1, and in other embodiments at least 4:1. In these or other embodiments, the aqueous suspension of PVC particles has a water to polymer weight ratio of at most 10:1, in other embodiments at most 9:1, and in other embodiments at most 8:1. In one or more embodiments, the aqueous suspension of PVC particles has a water to polymer weight ratio of from about 1:1 to about 10:1, in other embodiments from about 2:1 to about 9:1, and in other embodiments from about 3:1 to about 8:1.

In one or more embodiments, the PVC particles within suspension 36 may be characterized by a median particle size that is greater than 30 µm, in other embodiments greater than 50 µm, in other embodiments greater than 70 µm, in other embodiments greater than 90 µm, in other embodiments greater than 110 µm, and in other embodiments greater than 130 µm. In these or other embodiments, the PVC particles within suspension 36 may be characterized by a median particle size that is less than 900 µm, in other embodiments less than 750 µm, and in other embodiments less than 500 µm. In one or more embodiments, the PVC particles within suspension 36 may be characterized by a median particle size of from about 30 to about 900 µm, in other embodiments from about 50 to about 750 µm, in other embodiments from about 70 to about 500 µm, in other embodiments from about 90 to about 500 µm, and in other embodiments from about 110 to about 500 µm. As the skilled person appreciates, the particle size of the PVC may be determined by laser diffraction analysis.

PVC suspension 36 may optionally be transferred to one or more intermediary vessels after termination of the polymerization. For example, PVC suspension 36 may be transferred to blow down tanks or column feed tanks.

Whether or not transferred to an intermediary vessel, PVC suspension 36 may be subsequently treated to separate VCM (i.e. unreacted VCM) from PVC suspension 36 within a VCM separation step 27. This step may include the use of a separation column, such as a stripping column, wherein substantially all of the VCM is removed from the suspension. Recovered VCM can be circulated back to polymerization step or otherwise recycled or disposed of. A purified PVC suspension 38 (which may be referred to as reduced VCM suspension) results from separation step 27. In one or more embodiments, reduced VCM suspension includes less than 33 ppm, in other embodiments less than 15 ppm, in other embodiments less than 10 ppm, and in other embodiments less than 8 ppm VCM relative to the weight of the PVC particles. In one or more embodiments, purified PVC suspension 38 is substantially devoid of VCM, which includes that amount or less of VCM that does not have an appreciable impact on the suspension and/or practice of this invention.

Reduced VCM suspension 38 may then be treated to separate the PVC particles from the water. For example, in one or more embodiments, reduced VCM suspension 38 may be dewatered within dewatering step 29 to produce dewatered PVC particles 40. As the skilled person will appreciate, dewatering may include various techniques used to separate solids suspended within aqueous media. For example, these methods may include centrifuging PVC suspension 38.

In one or more embodiments, dewatered PVC particles 40, which may be referred to as PVC wet cake 40, may be characterized by a water content of from about 20 to about 30, in other embodiments from about 22 to about 28, and in other embodiments from about 23 to about 26 weight percent water.

Once dewatered PVC particles 40 are provided, these particles can be subsequently dried within drying step 31 to produce dried PVC particles 42. Conventional techniques for drying PVC particles are well known, and various techniques can be employed in the practice of this invention. For example, in one or more embodiments, drying of the wet cake can be accomplished in a flash dryer, a multi-stage flash dryer, a fluid bed dryer, a flash/fluid bed dryer combination, or a rotary dryer.

These dried PVC particles 42 can stored and/or transported. In the practice of this invention, dried PVC particles 42 can be transported to a location where chlorination of the PVC particles can take place.

Introduction of Accelerant

As suggested above, the chlorination accelerant can be associated with the PVC particles at one or more stages of the PVC production process.

In those embodiments where chlorination accelerant 50 is introduced to active polymerization mixture 32, chlorination accelerant 50 may be added directly to the vessel in which the polymerization is taking place. In one or more embodiments, the chlorination accelerant is introduced after at least a portion of the VCM has been polymerized (i.e. after introducing the initiator). In one or more embodiments, where the chlorination accelerant is added to the active polymerization mixture, this addition occurs after an appreciable amount of VCM has been converted. As the skilled person will appreciate, the addition of certain constituents, such as those compounds used herein as chlorination accelerants, can have an appreciable impact on the polymerization mixture or the polymerization of VCM and thereby alter the characteristics of the resulting PVC particles and/or suspension. Accordingly, in one or more embodiments, when added to the active polymerization mixture, the chlorination accelerant is added after that point in time where the accelerant would otherwise have an appreciable impact on the resulting PVC particles and/or suspension. For example, the chlorination accelerant may be added after 50%, in other embodiments after 60%, in other embodiments after 70%, and in other embodiments after 80% of the VCM has been converted or polymerized to PVC. The polymerization mixture may undergo agitation during and after the addition of the accelerant.

In those embodiments where chlorination accelerant 50 is added to PVC suspension 36 following termination step 25, chlorination accelerant 50 may be added directly to the vessel in which the polymerization and termination took place, or, in other embodiments, chlorination accelerant 50 is added in a downstream vessel such as one or more of the intermediary vessels described above including blow down tanks or column feed tanks. The suspension may undergo agitation during and after the addition of the accelerant.

In those embodiments where chlorination accelerant 50 is added to reduced VCM suspension 38 following VCM separation step 27, chlorination accelerant 50 may be added in a downstream vessel such as one or more blend or holding tanks that may be used to store reduced VCM suspension 38 prior to dewatering 29. The suspension may undergo agitation during and after the addition of the accelerant.

In those embodiments where chlorination accelerant 50 is added to the PVC particles during dewatering step 29, chlorination accelerant 50 may be added directly to the centrifuge. Where multiple cycles are employed to dewater the particles, chlorination accelerant 50 may introduced between cycles.

In those embodiments where chlorination accelerant 50 is added to dewatered PVC particles 40, chlorination accelerant may be introduced directly to the dewatered particles upon leaving the dewatering step. In one or more embodiments, where the accelerant is in the form of a liquid, the accelerant may be introduced to the wet cake PVC by spraying. Other techniques may include adding the liquid accelerant directly to the wet cake utilizing some means of mixing such as a screw feeder or vibratory feeder.

In those embodiments where chlorination accelerant 50 is introduced to the PVC particles during or after drying step 31, and where the accelerant is in the form of a liquid or solution, the accelerant may likewise be introduced to the dried PVC by spraying.

Characteristics of Final PVC Product

As suggested above, the chlorination accelerant is associated with the PVC particles. Without wishing to be bound by any particular theory, it is believed that the chlorination accelerant absorbs into and/or adsorbs onto the PVC particles. In one or more embodiments, the chlorination accelerant is not chemically bound to the PVC polymer or particles (i.e. not chemically incorporated). In one or more embodiments, the chlorination accelerant is substantially extractable from the PVC particles.

In one or more embodiments, dried PVC particles 42, which are associated with a chlorination accelerant, may be characterized by a median particle size that is greater than 30 µm, in other embodiments greater than 50 µm, in other embodiments greater than 70 µm, in other embodiments greater than 90 µm, in other embodiments greater than 110 µm, and in other embodiments greater than 130 µm. In these or other embodiments, PVC 42 particles may be characterized by a median particle size that is less than 900 µm, in other embodiments less than 750 µm, and in other embodiments less than 500 µm. In one or more embodiments, PVC particles 42 may be characterized by a median particle size of from about 30 to about 900 µm, in other embodiments from about 50 to about 750 µm, in other embodiments from about 70 to about 500 µm, in other embodiments from about 90 to about 500 µm, and in other embodiments from about 110 to about 500 µm. As the skilled person appreciates, the particle size of the PVC may be determined by laser diffraction analysis.

In one or more embodiments, dried PVC particles 42, which are associated with a chlorination accelerant, may be characterized by a porosity, as measured by ASTM D 3367-75, that is greater than 0.18, in other embodiments greater than 0.19, and in other embodiments greater than 0.20 cc/g. In these or other embodiments, PVC particles 42 may be characterized by a porosity of less than 0.48, in other embodiments less than 0.46, in other embodiments less than 0.44 cc/g, in other embodiments less than 0.42, in other embodiments less than 0.40 cc/g. in other embodiments less than 0.38, and in other embodiments less than 0.36 cc/g. In one or more embodiments, PVC particles 42 may be characterized by a porosity of from about 0.18 to about 0.48, in other embodiments from about 0.19 to about 0.46, and in other embodiments from about 0.20 to about 0.44 cc/g.

In one or more embodiments, dried PVC particles 42, which are associated with a chlorination accelerant, may be characterized by an inherent viscosity, as measured by ASTM D 1243-79 (1984), that is greater than 0.46, in other embodiments greater than 0.50, and in other embodiments greater than 0.55 dl/g. In these or other embodiments, PVC 42 particles may be characterized by an inherent viscosity of less than 1.55, in other embodiments less than 1.40, and in other embodiments less than 1.15 dl/g. In one or more embodiments, PVC 42 particles may be characterized by an inherent viscosity of from about 0.46 to about 1.55, in other embodiments from about 0.50 to about 1.40, and in other embodiments from about 0.55 to about 1.15 dl/g.

Chlorinating PVC Particles

As indicated above, the PVC particles produced according to practice of this invention can be chlorinated, and it has been unexpectedly discovered that by providing PVC particles associated with a chlorination accelerant according to embodiments of this invention, the rate of chlorination is improved over conventional PVC particles.

Accordingly, the manner in which the PVC particles of this invention are chlorinated does not bear on one or more embodiments of the invention. In particular embodiments, known chlorination techniques can be employed such as those disclosed in U.S. Pat. No. 4,412,898, which is incorporated herein by reference.

In one or more embodiments, chlorination of the PVC particles of this invention may proceed by employing conventional techniques such as free-radical chlorination. For example, in one or more embodiments, a chlorinating agent, such as chlorine, can be dispersed in aqueous medium in which the PVC particles are likewise dispersed. It is believed that the chlorinating agent, or a derivative thereof, associates with the PVC particles either by absorption or adsorption. The reaction between the PVC and the chlorinating agent or derivative thereof is initiated by the introduction of an initiator such as a chemical, photochemical, or thermal initiators. For example, UV light is believed to decompose chlorine into free-radical chlorine, which then reacts with the PVC to produce chlorinated PVC.

In one or more embodiments, the benefits of the present invention can be quantified based upon the percentage increase in chlorination rate between generally similar PVC particles. According to one or more embodiments of the present invention, practice of the present invention yields a chlorination rate increase, between generally similar PVC particles, of at least 5%, in other embodiments at least 7%, in other embodiments at least 10%, in other embodiments at least 12%, in other embodiments at least 15%, and in other embodiments at least 20%. For purposes of this specification, generally similar particle properties include those PVC particles that have a porosity differential, as determined by ASTM D3367-75, of less than 0.10 cc/g, in other embodiments less than 0.09 cc/g, in other embodiments less than 0.08 cc/g, in other embodiments less than 0.07 cc/g, and in other embodiments less than 0.06 cc/g. Likewise, in one or more embodiments, generally similar particle properties include those PVC particles that have a median particle size differential of less than 50 µm, in other embodiments less than 40 µm, in other embodiments less than 30 µm, in other embodiments less than 25 µm, and in other embodiments less than 20 µm. In one or more embodiments, generally similar particle properties include those PVC particles that have met the foregoing differential for both porosity and median particle size.

In order to demonstrate the practice of the present invention, the following examples have been prepared and tested. The examples should not, however, be viewed as limiting the scope of the invention. The claims will serve to define the invention.

EXPERIMENTAL

Example 1—Control

Polyvinyl chloride (PVC) particles were prepared by polymerizing vinyl chloride monomer within an aqueous suspension. The polymerization mixture was prepared by including about 500 ppm hydrolyzed poly(vinyl acetate) (PVA) (70-80% average hydrolysis) into the polymerization mixture prior to initiating polymerization (i.e. as a stabilizer). The polymerization conditions were otherwise controlled to produce polyvinyl chloride particles characterized by a median particle size of 171 µm, a porosity of 0.291 cc/g, and an inherent viscosity of 0.945. The polymerization was terminated by adding a terminator to the polymerization reactor. The particles were dewatered by centrifuging the suspension to produce a wet cake of PVC particles, and the wet cake was then dried to produce dried PVC particles. For purposes of this Experimental section, porosity was determined by employing techniques equivalent to ASTM D3367-75 and inherent viscosity was determined by employing techniques equivalent to ASTM D1243-79 (1984), with both methods being modified to achieve technological efficiencies.

The dried PVC particles prepared above were then chlorinated to produce chlorinated PVC (CPVC) by the following procedure. Thirty grams of the PVC particles and 500 grams of distilled water were charged to a one-liter, glass, photo-chlorination reactor. Rapid stirring produced an aqueous suspension of the PVC particles. Nitrogen gas was sparged into the slurry overnight using a thermal mass flow controller to remove oxygen from the system. The nitrogen sparging was about two inches below the surface of the liquid. After the overnight nitrogen purge, the reactor and contents were heated to 40° C. Once the temperature stabilized, nitrogen flow was stopped and chlorine gas was started. Chlorine gas was sparged into, and through, the slurry at a rate from 10.3 to 11.0 grams per hour.

After one hour of chlorine gas sparging, a UV lamp was illuminated to initiate chlorination of the PVC particles. The UV lamp was a jacketed UV lamp well positioned about one-fourth inch above the surface of the liquid. A 450-watt medium pressure Ace 7825 immersion UV lamp occupied the lamp well. Based on the one hour timeframe, the water and polyvinyl chloride resin slurry were fully saturated with chlorine before being irradiated with UV light.

Chlorine evolution from the solution was continuously monitored by sparging the reactor vent into a caustic solution. The amount of chlorine reacted with the PVC particles at any given time was determined by subtracting the amount of chlorine recovered in the vent from the amount fed.

Other details of the procedure included: tempered water from constant-temperature baths circulated through the reactor and lamp well jackets; vent gases exited through a water-cooled condenser to help return any entrained liquid to the reactor, then passed into a gas absorption bottle containing a solution of approximately seven percent NaOH in water; the absorption bottle rested on a digital laboratory balance which allowed continuous measurement of weight gain, and thus the rate of chlorine evolution from the reactor; and the reactor was wrapped with aluminum foil and fiberglass insulation.

Chlorine gas sparge flow was about 10.5 to about 10.8 grams per hour. From multiple trials it was determined that 12.0 grams of chlorine reacted with the resin in an average of 2.86 hours. The reaction of 12.0 grams of chlorine with 30.0 grams of PVC represents a final chlorine content in the CPVC resin of 64.24 percent. Since this Example represents a control, the chlorination rate was taken as a 100% reference point as set forth in Table I.

Example 2

A sample of PVC particles synthesized in Example 1 were employed in this Example. To this sample, 1000 ppm of additional hydrolyzed poly(vinyl acetate) (PVA) (about 70-80% average hydrolysis) was introduced to the particles after the particles were dewatered but not yet dried (i.e. introduced to the wet cake). Specifically, the wet cake was sprayed with a solution of the accelerant to the desired loading. The PVC wet cake was the subsequently dried. The dried PVC particles prepared within Example 2 were then chlorinated by using a procedure similar to that set forth in Example 1. In a single trial, 12.0 grams of chlorine reacted with the PVC particles in 2.20 hours. Thus, the average chlorination rate was 123 percent of that in Example 1 as shown in Table I.

Example 3

A sample of PVC particles synthesized in Example 1 were employed in this Example. To this sample, 2000 ppm of additional hydrolyzed poly(vinyl acetate) (PVA) (about 70-80% average hydrolysis) was introduced to the particles after the particles were dewatered buy not yet dried (i.e. introduced to the wet cake) in a manner described in Example 2 and then similarly dried. The dried PVC particles prepared within this Example were then chlorinated by using a procedure similar to that set forth in Example 1. In a single trial, 12.0 grams of chlorine reacted with the PVC particles in 2.34 hours. Thus, the average chlorination rate was 118 percent of that in Example 1 as shown in the Table.

Example 4

A sample of PVC particles synthesized in Example 1 were employed in this Example. To this sample, 2000 ppm of hydroxypropylmethyl cellulose (HPMC), which may be referred to as HPMC, having a hydroxypropoxyl content between 5 and 12 weight % and a methoxyl content between 18 and 29%, was introduced to the particles after the particles were dewatered but not yet dried (i.e. introduced to the wet cake) in a manner described in Example 2 and then similarly dried. The dried PVC particles prepared within this Example were then chlorinated by using a procedure similar to that set forth in Example 1. In a single trial, 12.0 grams of chlorine reacted with the PVC particles in 2.42 hours. Thus, the average chlorination rate was 115 percent of that in Example 1 as shown in Table I.

TABLE I

| Example # | Added Accelerant Amount (PPM) | Accelerant Addition Mode | Accelerant Type | PVC Porosity (cc/g) | Median Particle Size (μm) | Chlorination Rate (%) |
|---|---|---|---|---|---|---|
| 1 | 0 | N/A | N/A | 0.291 | 171 | 100 |
| 2 | 1000 | Wet Cake | PVA | 0.291 | 171 | 123 |
| 3 | 2000 | Wet Cake | PVA | 0.291 | 171 | 118 |
| 4 | 2000 | Wet Cake | HPMC | 0.291 | 171 | 115 |

The data in Table I shows that the addition of accelerant to the PVC particles has an appreciable impact on the chlorination rate. Notably, this benefit is observed when adding the accelerant to the wet cake at amount of 1000 and 2000 ppm for PVA, and the benefit is likewise observed when HPMC is used as an accelerant.

Example 5—Control

Polyvinyl chloride (PVC) particles were prepared by polymerizing vinyl chloride monomer within an aqueous suspension. The polymerization mixture was prepared by including about 500 ppm hydrolyzed polyvinyl acetate (about 70-80% average hydrolysis) into the polymerization mixture prior to initiating polymerization. The polymerization conditions were otherwise controlled to produce polyvinyl chloride particles characterized by a median particle size of 172, a porosity of 0.284 cc/g, and an inherent viscosity of 0.940 dl/g. The polymerization was terminated by adding a terminator to the polymerization reactor. The particles were dewatered by centrifuging the suspension to produce a wet cake of PVC particles, and the wet cake was then dried to produce dried PVC particles.

The dried PVC particles prepared within this Example were then chlorinated by using a procedure similar to that set forth in Example 1. From multiple trials it was determined that 12.0 grams of chlorine reacted with the resin in an average of 3.82 hours. The reaction of 12.0 grams of chlorine with 30.0 grams of PVC represents a final chlorine content in the CPVC resin of 64.24 percent. Since this Example represents a control, the chlorination rate was taken as a 100% reference point as set forth in Table II.

Example 6

PVC particles were synthesized using the same procedure set forth in Example 5 except that 1000 ppm of additional hydrolyzed poly(vinyl acetate) (PVA) (about 70-80% average hydrolysis) was introduced into the polymerization reactor after about 70% vinyl chloride monomer was converted but prior to the addition of the terminator. The particles were likewise dewatered and dried. The resulting PVC particles were characterized by a median particle size of 166, a porosity of 0.284 cc/g, and an inherent viscosity of 0.932 dl/g.

The dried PVC particles prepared within this Example were then chlorinated by using a procedure similar to that set forth in Example 1. In a single trial, 12.0 grams of chlorine reacted with the resin in 2.99 hours. The average chlorination rate was thus 122 percent of that in Example 5 as shown in Table II.

Example 7

PVC particles were synthesized using the same procedure set forth in Example 5 except that 1000 ppm of hydroxypropylmethyl cellulose (HPMC) (hydroxypropoxyl content between 5 and 12 weight % and a methoxyl content between 18 and 29%) was introduced into the polymerization reactor after about 70% vinyl chloride monomer was converted but prior to the addition of the terminator. The particles were likewise dewatered and dried. The resulting PVC particles were characterized by a median particle size of 175, a porosity of 0.291 cc/g, and an inherent viscosity of 0.932 dl/g.

The dried PVC particles prepared within this Example were then chlorinated by using a procedure similar to that set forth in Example 1. In a single trial, 12.0 grams of chlorine reacted with the resin in 3.09 hours. The average chlorination rate was thus 119 percent of that in Example 5 as shown in Table II.

Example 8

PVC particles were synthesized using the same procedure set forth in Example 5 except that 500 ppm of hydroxypropylmethyl cellulose (HPMC) (hydroxypropoxyl content between 5 and 12 weight % and a methoxyl content between 18 and 29%) was introduced into the polymerization reactor after about 70% vinyl chloride monomer was converted but prior to the addition of the terminator. The particles were likewise dewatered and dried. The resulting PVC particles were characterized by a median particle size of 176, a porosity of 0.298 cc/g, and an inherent viscosity of 0.941 dl/g.

The dried PVC particles prepared within this Example were then chlorinated by using a procedure similar to that set forth in Example 1. In a single trial, 12.0 grams of chlorine reacted with the resin in 3.59 hours. The average chlorination rate was thus 106 percent of that in Example 30 as shown in Table II.

Example 9—Control

Polyvinyl chloride (PVC) particles were prepared by polymerizing vinyl chloride monomer within an aqueous suspension. The polymerization mixture was prepared by including about 600 ppm hydrolyzed poly(vinyl acetate) (PVA) (about 70-80% average hydrolysis) into the polymerization mixture prior to initiating polymerization (i.e. as a stabilizer). The polymerization conditions were otherwise controlled to produce polyvinyl chloride particles characterized by a median particle size of 156 μm, a porosity of 0.293 cc/g, and an inherent viscosity of 0.916 dl/g. The polymerization was terminated by adding a terminator to the polymerization reactor. The particles were dewatered by centrifuging the suspension to produce a wet cake of PVC particles, and the wet cake was then dried to produce dried PVC particles.

The dried PVC particles prepared within this Example were then chlorinated by using a procedure similar to that set forth in Example 1. Since this Example represents a control, the chlorination rate was taken as a 100% reference point as set forth in Table III.

Example 10

PVC particles were prepared by polymerizing vinyl chloride monomer within an aqueous suspension. The polymerization mixture was prepared by including about 1700 ppm hydrolyzed poly(vinyl acetate) (PVA) (about 70-80% average hydrolysis) into the polymerization mixture prior to initiating polymerization. The polymerization conditions were otherwise maintained as in Example 9. The polymerization was terminated by adding a terminator to the polymerization reactor. The resulting PVC particles were characterized by a median particle size of 52 μm, a porosity of 0.384 cc/g, and an inherent viscosity of 0.904 dl/g. The particles were dewatered by centrifuging the suspension to produce a wet cake of PVC particles, and the wet cake was then dried to produce dried PVC particles.

TABLE II

| Example # | Added Accelerant Amount (PPM) | Accelerant Addition Mode | Accelerant Type | PVC Porosity (cc/g) | Median Particle Size (μm) | Chlorination Rate (%) |
|---|---|---|---|---|---|---|
| 5 | 0 | N/A | N/A | 0.284 | 172 | 100 |
| 6 | 1000 | 70% Polymerized | PVA | 0.284 | 166 | 122 |
| 7 | 1000 | 70% Polymerized | HPMC | 0.291 | 175 | 119 |
| 8 | 500 | 70% Polymerized | HPMC | 0.298 | 176 | 106 |

The data in Table II demonstrates the increased chlorination rate obtained by employing an accelerant according to the practice of the present invention that can be obtained even when the accelerant is introduced to the PVC particles after appreciable polymerization. As with the data in Table I, the benefits are observed with both PVA and HPMC, and the benefit can was observed even with the addition of 500 ppm HPMC. Additionally, the data in Table II shows that the addition of the accelerant after appreciable polymerization but before the polymerization was completed did not have appreciable impact on the properties of the PVC particles. Notably, porosity and median particle size were not statistically impacted.

The dried PVC particles prepared within this Example were then chlorinated by using a procedure similar to that set forth in Example 1.

TABLE III

| Example # | PVA Stabilizer (PPM) | Accelerant Addition Mode | PVC Porosity (cc/g) | Median Particle Size (μm) | Chlorination Rate (%) |
|---|---|---|---|---|---|
| 9 | 600 | Initial Charge | 0.293 | 156 | 100 |
| 10 | 1700 | Initial Charge | 0.384 | 52 | — |

The data in Table III demonstrates that the addition of the accelerant prior to polymerization (which is tantamount to an increased load of stabilizer) had a significant impact on the properties of the PVC particles. When the chlorination procedure outlined above was employed, chlorination could not be completed because the relatively small PVC particles floated out of suspension. Also, the skilled person will appreciate that even if the chlorination system could have been manipulated to chlorinate the relatively small PVC particles, an accurate comparison to the control could not be achieved since marked differences in porosity and particle size preclude an accurate comparison. Indeed, the skilled person appreciates that particles having a larger porosity and/or smaller particle size will chlorinate faster even in the absence of the accelerant of the present invention.

All references cited herein are hereby incorporated by reference in their entireties. A number of embodiments of the invention have been described. Nevertheless, it will be understood that various modifications may be made without departing from the spirit and scope of the invention. Accordingly, other embodiments are within the scope of the following claims.

What is claimed is:

1. A method for providing particles of polyvinyl chloride, wherein the particles offer improved chlorinating efficiency, the method comprising:
   (i) providing an active polymerization mixture including vinyl chloride monomer to thereby form polyvinyl chloride particles;
   (ii) allowing the vinyl chloride monomer to polymerize to the polyvinyl chloride particles at a conversion of at least 60%, wherein the polyvinyl chloride particles have a median particle size of from about 90 µm to about 500 µm, an inherent viscosity of from about 0.50 dl/g to about 1.40 dl/g, and a porosity of from about 0.284 cc/g to 0.44 cc/g, to thereby form a dispersion including water and the polyvinyl chloride particles from the conversion of the at least 60% of the vinyl chloride monomer; and
   (iii) introducing, after said step of allowing the vinyl chloride monomer to polymerize, a chlorination accelerant to the dispersion including the water and the polyvinyl chloride particles, to thereby associate the chlorination accelerant with the polyvinyl chloride particles and thereby provide polyvinyl chloride particles having an accelerant associated therewith, where said step of introducing a chlorination accelerant to the polyvinyl chloride particles includes introducing from 500 ppm to 5,000 ppm by weight chlorination accelerant based upon the total weight of the polyvinyl chloride particles, wherein the polyvinyl chloride particles having an accelerant associated therewith yield a chlorination rate increase of at least 10% for a subsequent step of chlorination compared to similar polyvinyl chloride particles without having an accelerant associated therewith.

2. The method of claim 1, further comprising a step of separating the polyvinyl chloride particles having an accelerant associated therewith from the water.

3. The method of claim 2, where said step of separating includes drying the particles.

4. The method of claim 1, further comprising a step of separating the polyvinyl chloride particles from the water, where said step of separating includes centrifuging and drying.

5. The method of claim 1, where the polyvinyl chloride particles having an accelerant associated therewith are devoid of a swelling agent.

6. The method of claim 1, where the polyvinyl chloride particles having an accelerant associated therewith are devoid of a halo-hydrocarbon swelling agent.

7. The method of claim 1, where the chlorination accelerant is a nonionic oligomer or polymer containing a hydroxyl group functionality attached to a linked backbone selected from the group consisting of an aliphatic linked backbone, an ether-linked backbone, and an aliphatic and ether linked backbone.

8. The method of claim 1, where the chlorination accelerant is selected from the group consisting of polyvinyl alcohol, partially hydrolyzed poly(vinyl acetate) homopolymer, partially hydrolyzed co-polymers of vinyl acetate and comonomer, heat-treated partially hydrolyzed poly(vinyl acetate) homopolymer, heat-treated partially hydrolyzed co-polymers of vinyl acetate and comonomer, polyethylene glycol, poly(alkylene) oxides, hydroxypropyl cellulose, hydroxyethyl cellulose, hydroxypropyl methylcellulose, and water-soluble cellulose esters, wherein the poly(alkylene) oxides are selected from the group consisting of poly(ethylene) oxide and poly(propylene) oxide.

9. The method of claim 1, where the polyvinyl chloride particles having an accelerant associated therewith include polyvinyl chloride particles having an accelerant absorbed into and/or adsorbed onto the particle.

10. The method of claim 1, where said step of introducing a chlorination accelerant to the polyvinyl chloride particles includes introducing at least 1000 ppm by weight chlorination accelerant based upon the total weight of the polyvinyl chloride particles.

11. The method of claim 1, where said step of providing the active polymerization mixture includes
   (i) providing a dispersion of vinyl chloride monomer dispersed within water,
   (ii) initiating the polymerization of the vinyl monomer, and
   (iii) terminating the polymerization of the vinyl chloride monomer, where said step of adding a chlorination accelerant to the dispersion takes place after said step of terminating the polymerization of the vinyl chloride monomer.

12. The method of claim 1, where said step of providing the active polymerization mixture includes polymerizing the vinyl chloride monomer in water within a first vessel, transferring the polyvinyl chloride particles and water to a second vessel, and wherein the step of introducing includes introducing the chlorination accelerant to the second vessel.

13. The method of claim 1, where a step of storing or transporting the polyvinyl chloride particles having an accelerant associated therewith occurs prior to a step of chlorinating the polyvinyl chloride particles having an accelerant associated therewith.

14. The method of claim 1, where said step of providing the active polymerization mixture includes (i) providing a dispersion of vinyl chloride monomer dispersed within water, (ii) initiating the polymerization of the vinyl monomer, and (iii) terminating the polymerization of the vinyl chloride monomer, where said step of adding a chlorination accelerant to the dispersion takes place after said step of initiating the polymerization of the vinyl monomer and before said step of terminating the polymerization of the vinyl chloride monomer.

15. The method of claim 1, where said step of introducing a chlorination accelerant takes place before a step of terminating the polymerization of the vinyl chloride monomer.

16. The method of claim 1, where the chlorination accelerant is hydroxypropyl methylcellulose.

17. A method for providing particles of polyvinyl chloride, wherein the particles offer improved chlorinating efficiency, the method comprising:
(i) providing a polymerization mixture including vinyl chloride monomer suspended in water, at a weight ratio of the water to the vinyl chloride monomer of from about 0.9:1 to about 10:1;
(ii) introducing an initiator to the polymerization mixture to thereby form an active polymerization mixture;
(iii) allowing the vinyl chloride monomer in the active polymerization mixture to polymerize to polyvinyl chloride particles at a conversion of at least 60%, wherein the polyvinyl chloride particles have a median particle size of from about 90 μm to about 500 μm, an inherent viscosity of from about 0.50 dl/g to about 1.40 dl/g, and a porosity of from about 0.284 cc/g to 0.44 cc/g, to thereby form a dispersion including water and the polyvinyl chloride particles from the conversion of the at least 60% of the vinyl chloride monomer; and
(iv) introducing, after said step of allowing, a chlorination accelerant to the dispersion including the water and the polyvinyl chloride particles to thereby provide polyvinyl chloride particles having an accelerant associated therewith, wherein the polyvinyl chloride particles having an accelerant associated therewith yield a chlorination rate increase of at least 10% for a subsequent step of chlorination compared to similar polyvinyl chloride particles without having an accelerant associated therewith, where said step of introducing a chlorination accelerant to the polyvinyl chloride particles includes introducing from 500 ppm to 5,000 ppm by weight chlorination accelerant based upon the total weight of the polyvinyl chloride particles.

* * * * *